(No Model.)
J. J. JOHNSTON.
GARDEN VASE.
No. 265,097. Patented Sept. 26, 1882.
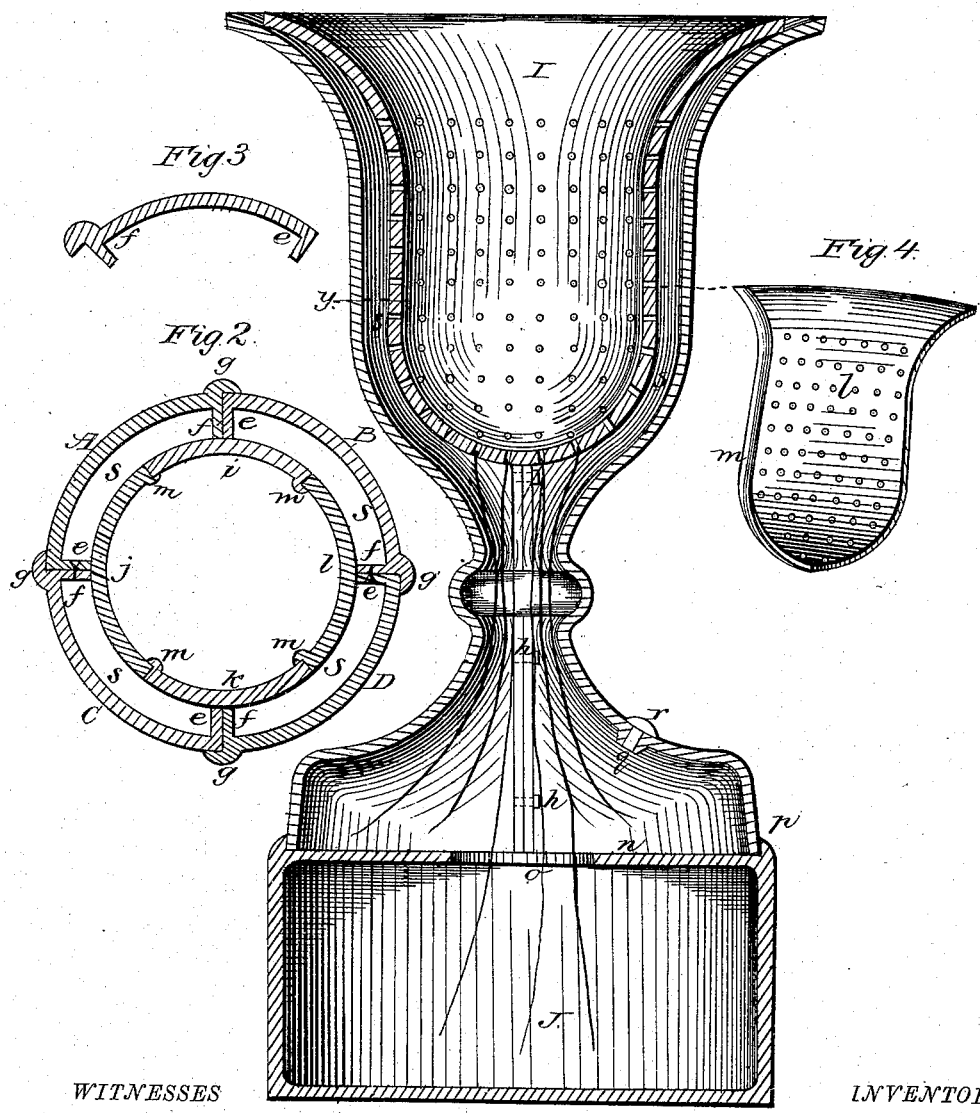
WITNESSES
INVENTOR

UNITED STATES PATENT OFFICE.

JAMES J. JOHNSTON, OF COLUMBIANA, OHIO, ASSIGNOR TO THE UNITED STATES IMPROVEMENT COMPANY, (LIMITED,) OF SAME PLACE.

GARDEN-VASE.

SPECIFICATION forming part of Letters Patent No. 265,097, dated September 26, 1882.

Application filed February 23, 1882. (No model.)

*To all whom it may concern:*

Be it known that I, JAMES J. JOHNSTON, of Columbiana, in the county of Columbiana and State of Ohio, have invented a certain new and useful Improvement in Garden-Vases; and I do hereby declare that the following is a full, clear, and exact description thereof, reference being had to the accompanying drawings, and to the letters of reference marked thereon.

My invention relates to an improvement in garden-vases; and it consists in constructing the vase in sections having flanges projecting inwardly for the purpose of uniting the sections together, said flanges serving as a support for an earth-chamber made in sections having perforated walls, and combining with said vase a capped reservoir for water, with a central opening, all constructed, arranged, and operating as will hereinafter more fully and at large appear.

To enable others skilled in the art with which my invention is most nearly connected to make and use it, I will proceed to describe its construction and operation.

In the accompanying drawings, which form a part of this specification, Figure 1 is a vertical section of my improvement in garden-vases. Fig. 2 is a transverse section of same at line *y*, Fig. 1. Fig. 3 is a transverse section of one of the sections of the outer wall of the vase. Fig. 4 is a perspective view of one of the sections of the earth-chamber.

Reference being had to the accompanying drawings, A, B, C, and D represent the four sections which form the outer wall of the vase, which sections are furnished with flanges *e* and *f*, a bead, *g*, for covering the joint formed by the union of the said sections, as indicated in Fig. 2, which sections are secured together by bolts *h*, passing through the flanges *e f*, as shown in Fig. 1.

The earth-chamber I is constructed of four sections, *i j k l*, each section having a bead, *m*, for covering the joint formed by the union of the four sections, said sections having a large number of perforations, as shown in Fig. 4, and the sections held together through the medium of the flanges *e f* of sections A B C D, as shown in Fig. 2. The vase, when completed, rests upon a reservoir, J, having a cap, *n*, with opening *o*, and a projecting flange, *p*, for holding the vase in position on said reservoir. In the pedestal of the base is an opening, *q*, having a plug, *r*, which opening is used for the purpose of supplying the reservoir with water. When the earth-chamber is arranged within the sections A B C D, as shown in Figs. 1 and 2, a space, *s*, is formed between the outer wall of said earth-chamber and inner wall of said sections, so that the water in the reservoir J will, in evaporating, pass up around the earth-chamber I, and be absorbed through the openings of the walls thereof by the earth in said chamber, thereby imparting to it humidity sufficient for the growth of the plants. Through openings in the bottom of the earth-chamber I are a series of woolen cords or threads leading down into the water-reservoir J. These threads conduct the water by capillary attraction to the earth in the lower part of said chamber.

The advantage of constructing a garden-vase in sections and the earth-chamber in sections facilitates and diminishes the cost of manufacture of said vases. The outer wall of the vase and the earth-chamber I is cast from a single pattern of one of the sections when made of cast-iron, which is the most desirable material; but when made of terra-cotta a single mold for one of the sections of the outer wall of the vase and a single mold for one of the sections of the earth-chamber is all that is necessary. Vases for garden use are, as a rule, of large construction, and the impracticability of casting them in a single piece or in halves will be apparent to the skillful molder; but when cast in sections, as hereinbefore described, a vase of almost any desired height and diameter can be molded and cast with the ease and facility of making an ordinary casting.

The reservoir J is cast in one piece, with a central opening, *o*, in the cap or top *n*, with a flange, *p*, for holding the vase in position on said reservoir. The advantage of casting the reservoir in a single piece with the central opening, *o*, consists in preventing the evaporation of the water from the reservoir J only through said opening, which is directly under and concentric with the vertical axis of the earth-chamber I, thereby causing the vapor to pass up and around said chamber and up into the space $s$ around said earth-chamber.

Having thus described my invention, what I claim as new, and desire to secure by Letters Patent, is—

1. In a garden-vase, the outer walls constructed in sections having flanges $e\,f$ and bead $g$, in combination with the earth-chamber I, constructed in sections having bead $m$, and said sections being held together and supported upon the flanges $e\,f$, substantially as herein described, and for the purpose set forth.

2. In a garden-vase, the outer walls constructed in sections having flanges $e\,f$ and bead $g$, and earth-chamber I, constructed in sections having bead $m$, and said sections held together and supported upon the flanges $e\,f$, in combination with the water-reservoir J, constructed in one piece with opening $o$, substantially as herein described, and for the purpose set forth.

JAMES J. JOHNSTON.

Witnesses:
T. D. D. OURAND,
FRED. G. DIETERICH.